United States Patent [19]
Kenny

[11] Patent Number: 6,132,854
[45] Date of Patent: Oct. 17, 2000

[54] SECURITY PAPER WITH SHRINKING POLYMER SECURITY FEATURE

[75] Inventor: Frank J. Kenny, Centerville, Ohio

[73] Assignee: NCR Corporation, Dayton, Ohio

[21] Appl. No.: 09/107,369

[22] Filed: Jun. 30, 1998

[51] Int. Cl.[7] .............................. B32B 3/10; B32B 23/06; B32B 27/08; B32B 27/10; B32B 27/34
[52] U.S. Cl. ................ 428/211; 428/213; 428/411.1; 428/479.6; 428/508; 428/511; 428/515; 428/537.5; 428/916
[58] Field of Search .................... 428/411.1, 508, 428/511, 515, 537.5, 916, 213, 195, 211, 479.6

[56] References Cited

U.S. PATENT DOCUMENTS

| | | | |
|---|---|---|---|
| 4,150,997 | 4/1979 | Hayes | 106/15.05 |
| 4,153,593 | 5/1979 | Zabiak et al. | 524/110 |
| 4,328,332 | 5/1982 | Hayes et al. | 528/296 |
| 4,865,914 | 9/1989 | Malhotra | 428/331 |
| 5,405,678 | 4/1995 | Bilodeau | 428/211 |
| 5,468,581 | 11/1995 | Coe et al. | 430/22 |

OTHER PUBLICATIONS

Kirk–Othmer, Encyclopedia of Chemical Technology, 3rd Edition, vol. 16, pp. 778–779.
Martin J. Snowden et al., "Some like it hot! Thermo–sensitive polymers", 1996, pp. 1–4.
Zhibing Hu et al., "Flexing gels", 1996, p. 1.

*Primary Examiner*—Paul Thibodeau
*Assistant Examiner*—Ramsey Zacharia
*Attorney, Agent, or Firm*—Millen White Zelano and Branigan

[57] ABSTRACT

A security paper with a thermoshrinking polymer layer as a security feature wherein the layer of thermoshrinking polymer shrinks and distorts the security paper when heated, demonstrating its authenticity.

14 Claims, 5 Drawing Sheets

SECURITY PAPER WITH SHRINKING POLYMER SECURITY FEATURE

FIELD OF THE INVENTION

The present invention relates to security paper used to thwart counterfeiting of printed commercial documents such as sales transaction records and receipts.

BACKGROUND OF THE INVENTION

Many different means of security are available to prevent the duplication of printed commercial documents such as special papers (water marked paper or metal fiber filled paper) and special inks (fluorescent ink and other optically variable inks) which form latent images that change color under U.V. light or repel water. Examples of special papers and inks are described in U.S. Pat. Nos. 4,150,997, 4,153,593, 4,328,332 and 5,468,581. While the use of special papers and special inks as security measures has been effective and versatile, with the advent of today's personal computers and color copiers, conventional security features such as these have been overcome, particularly where fluorescent images and water marks are used in environments where records are only casually inspected, such as sales receipts and transaction records. Therefore, it is desirable to provide additional security measures which either replace or supplement conventional security features.

Providing security measures to paper is complicated by many factors. One is that the many types of printing inks and papers are often adapted to be employed in particular printing operations. For example, the papers used in ink jet printing require special coatings to provide high resolution and the inks used in ink jet printing often must be conductive, have viscosity values within a certain range and contain no large particulate matter. Security features cannot interfere with these requirements. Similarly, the papers and inks employed in thermal transfer printing, relief printing, offset printing, intaglio printing, flexographic printing, thermal printing, lithography and silk screening have features which must be considered when a security feature is provided.

Where the paper or ink formulation already has a security measure, adding a security feature to a security paper is more difficult in that the new security feature must complement the performance of the existing features without conflict. Another factor to consider is that it is often desirable to provide security features "on-demand" where special papers are used for commercial documents. There are also practical limitations on security features in that they must be easy to apply and use so as not to add significantly to the cost of the transaction. Parameters such as these restrict the availability of security features, making it difficult to employ new or multiple security measures for a transaction receipt which cannot be easily circumvented.

SUMMARY OF THE INVENTION

It is object of the present invention to provide a security paper with a security feature to prevent counterfeiting that will not conflict with the features of various inks and papers.

It is another object of the present invention to provide a security feature for printed documents to prevent counterfeiting that can be used with various inks and papers.

It is yet another object of the present invention to provide a security paper with multiple security features to prevent counterfeiting that do not conflict with each other and are simple to use.

It is an additional object of the present invention to provide a security paper with a thermoshrinking polymer security feature to prevent counterfeiting.

It is a further object of the present invention to provide a paper with a thermoshrinking polymer coated thereon.

Upon further study of the specification and appended claims, further objects and advantages of this invention will become apparent and further understood from the detailed description and claims which follow.

The above objects are achieved through a paper which has a thermoshrinking polymer layer coated thereon. In preferred embodiments, the paper comprises a base sheet with a bi-layer deposited thereon which comprises a polymer layer in immediate contact with the base sheet and a layer of thermoshrinking polymer positioned on this polymer layer. The thermoshrinking polymer has a coefficient of thermal expansion distinct from the polymer of the first polymer layer.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED SUMMARY OF THE PREFERRED EMBODIMENTS

The security papers of the present invention comprise a base sheet. The base sheet can be a paper conventionally used in either impact printing, ink jet printing, flexographic printing, thermal transfer printing, electrostatic printing, thermal printing, relief printing, offset printing, intaglio printing, lithography and silk screening. Suitable base sheets typically comprise natural or synthetic fibers or both and are either filled or unfilled with pigments such as titanium dioxide. The base sheet can be coated or uncoated to modify performance such as absorption of inks or, as in the case of thermal paper, to provide reactive elements that generate color upon the application of heat. Where a thermal paper is used, it is preferably coated on only one side and the thermoshrinking polymer is applied to the side without thermally reactive components.

The base sheet has a layer of thermoshrinking polymers coated thereon which has a coefficient of thermal expansion distinct from the base sheet. The thermoshrinking polymers are those which shrink when heated to a certain temperature.

The base sheet or a bilayer of the thermoshrinking polymer and another polymer layer (with a distinct coefficient of thermal expansion) will bend in response to an increase in temperature. The shape of the distorted base sheet will depend on the temperature. The difference in the coefficients of thermal expansion between the thermoshrinking polymer and the base sheet or polymer layer is much larger than between two metals; therefore, these bilayers are much more sensitive to their environments than bi-metals.

Figure 1:
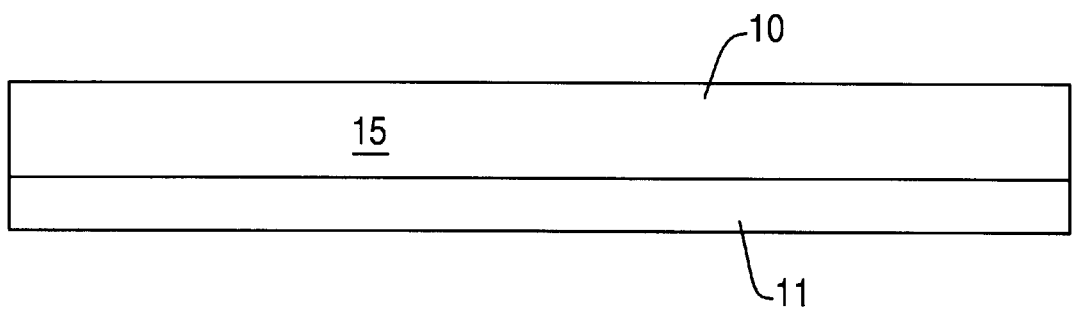
FIG. 1 is a side view of a paper of this invention with a base sheet and a layer of thermoshrinking polymer.
Figure 2:
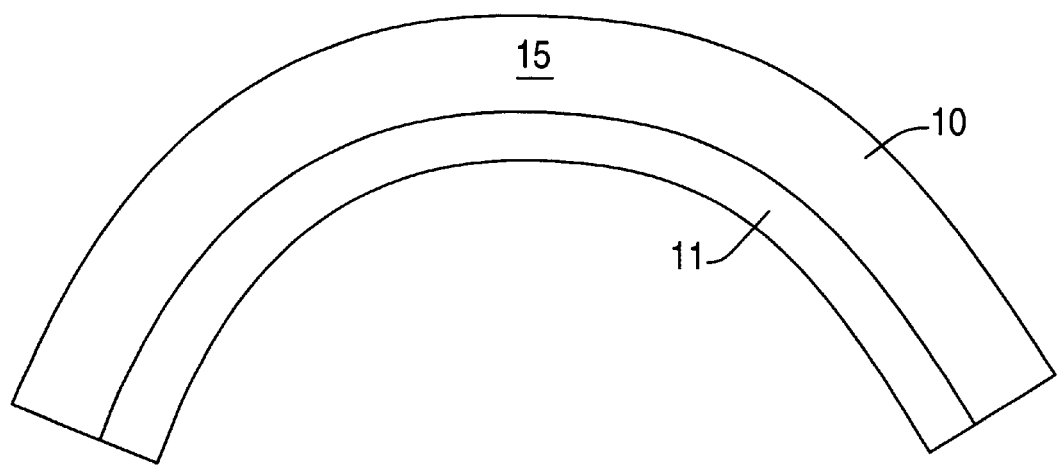
FIG. 2 is a side view of a paper of FIG. 1 exposed to a temperature above the phase transition temperature of the thermoshrinking polymer.

The thermoshrinking polymer can be deposited directly on the base sheet, either coated or uncoated, preferably at a thickness which will distort the base sheet when heated to its activation temperature. An example is security paper 15 shown in FIG. 1. Base sheet 10 is coated with thermoshrinking polymer layer 11. FIG. 2 shows security paper 15 of FIG. 1 at a temperature above the activation temperature of the thermoshrinking polymers in layer 11.

Figure 3:
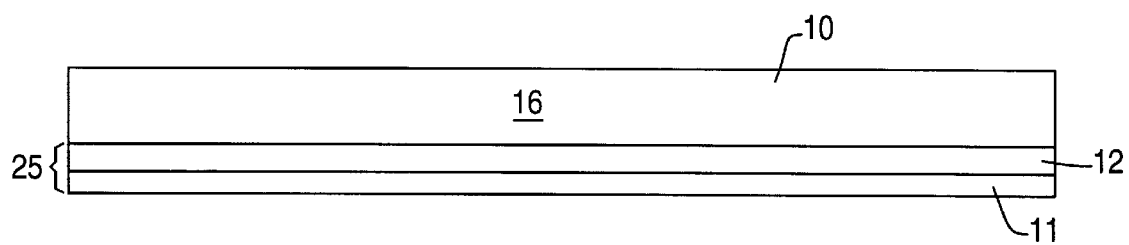
FIG. 3 is a side view of a security paper of this invention which has a bi-layer positioned on a base sheet.
Figure 4:
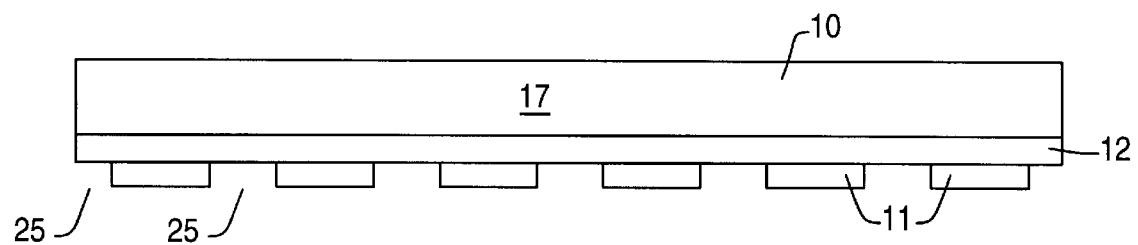
FIG. 4 is a side view of another security paper of this invention wherein the thermoshrinking polymer of a bi-layer is positioned on portions of a continuous polymer layer.
Figure 5:
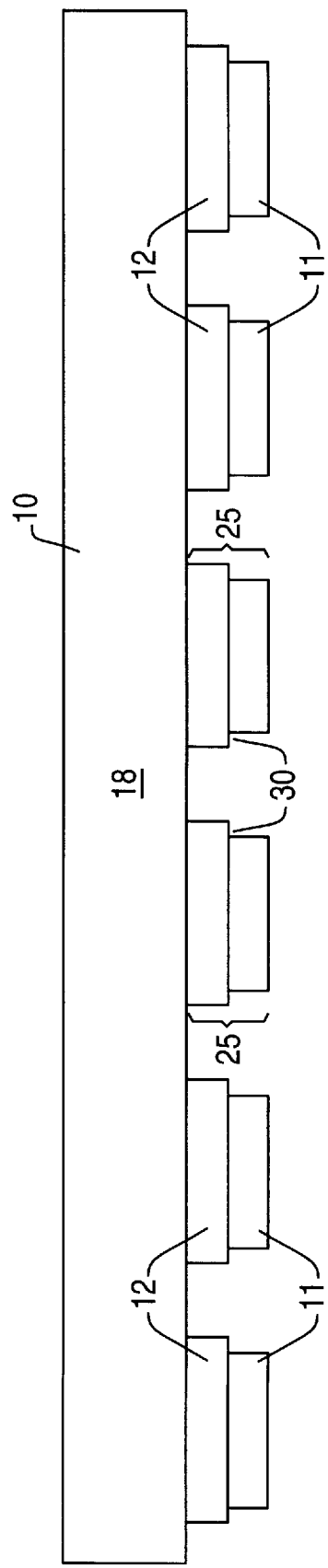
FIG. 5 is a side view of another security paper of this invention wherein the bi-layer is positioned on portions of a base layer.

FIGS. 3–5 show security papers 16, 17 and 18, respectively, wherein the base sheet 10 is coated with a bi-layer 25. Bi-layer 25 comprises a polymer layer 12, which contacts base sheet 10, and a layer of thermoshrinking polymer 11. In security paper 16 of FIG. 3, the thermoshrinking polymer layer 11 is applied as a continuous layer on a continuous polymer layer 12. For security paper 17 of FIG. 4, the thermoshrinking polymer layer 11 is applied as segments on a continuous polymer layer 12, forming multiple bilayers 25 on various regions of base sheet 10. FIG. 5 shows security paper 18 wherein the polymer layer 12 is also segmented with thermoshrinking polymer layer 11 to provide multiple bilayers 25 on separate regions of base sheet 10.

The use of a bi-layer preferably enhances the response to the activation temperature by providing a coefficient of thermal expansion further distinguished from the thermoshrinking polymer than the base sheet. To further enhance the response to temperature, the bi-layer preferably has an inter-penetrating polymer network 30, shown in FIGS. 5, 6 and 7, between the polymer layer and the layer of thermoshrinking polymers. This inter-penetrating polymer network is comprised of the thermoshrinking polymers and polymers of the polymer layer and can be obtained by co-depositing the thermoshrinking polymer and the polymer of the polymer layer. This interpenetrating polymer network provides a strong bond between the two layers such that the shrinkage of the thermoshrinking polymer layer will bend the polymer layer and not separate therefrom.

The thickness of the thermoshrinking polymer layer is typically limited by cost, loss of adhesion to the base sheet or polymer layer or interference with printing operations.

The bi-layer preferably has a thickness sufficient to distort the base sheet when exposed to heat. Preferably, the thickness of the bi-layer is less than the thickness of the base sheet, so as not to significantly add to the thickness of the web during printing operations. The thermal shrinking polymer layer can have a thickness of at least one-half the thickness of the polymer layer.

Not only is the thickness of the bi-layer significant in distorting the paper, it is necessary that a significant portion of the surface of the base sheet be coated with the bi-layer to provide a detectable response. Preferably, from 5–100% of the base sheet is covered with the bi-layer and preferably the bi-layer extends along the length of said base sheet. For embodiments wherein the base sheet is covered with segments of thermoshrinking polymer or bi-layer in two or more regions, each region preferably comprises at least 5% of the surface of said base sheet such that shrinkage of the thermoshrinking layer will provide a distortion that is easily noticed.

Figure 6:
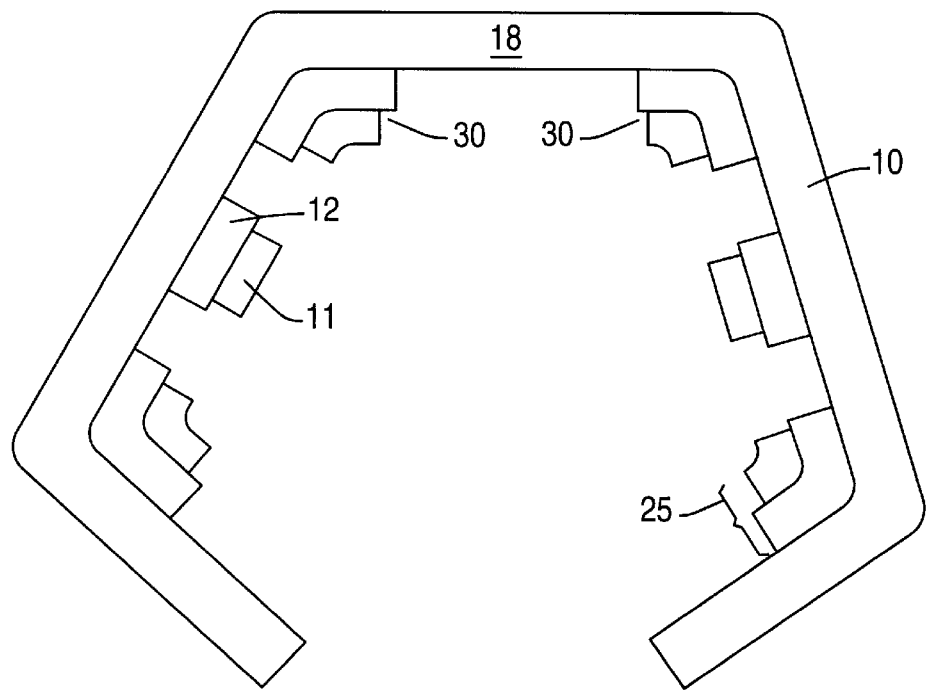
FIG. 6 is a side view of the embodiment of FIG. 5 at an activation temperature.
Figure 7:
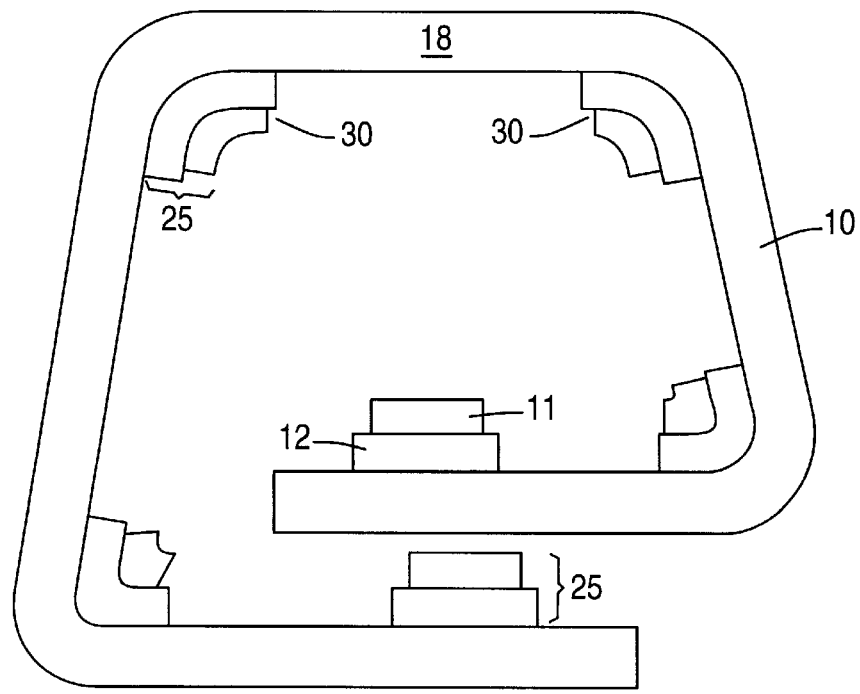
FIG. 7 is a side view of the embodiment of FIG. 5 at a second phase transition temperature.

In preferred embodiments, the thermoshrinking polymer used has an activation temperature within the range of 40–70° C. Polymers with such a activation temperature simplify the use of the security feature. The substrate can be heated simply with an incandescent light bulb or similar low to moderate energy heat source. Such low activation temperatures also prevent discoloration of thermal papers. In certain embodiments, the thermoshrinking polymer may have two activation temperatures in the range of 40–70° C. This is exemplified in FIGS. 6 and 7. FIG. 6 illustrates the security paper 18 of FIG. 5 at a temperature above the first activation temperature of the thermoshrinking polymers. FIG. 7 illustrates security paper 18 of FIG. 5 at a second (higher) activation temperature.

In preferred embodiments, the response from the bi-layer to temperatures above its activation temperature is reversible. This allows the distorted papers of FIGS. 6 and 7 to return to the configuration shown in FIG. 5. The preferred bi-layer for accomplishing this comprises a polymer layer of polyacrylamide and a thermoshrinking polymer layer of poly(N-isopropylacrylamide). Preferred embodiments of this bi-layer have an inter-penetrating polymer network of the polyacrylamide and poly (N-isopropylacrylamide).

Figure 8:
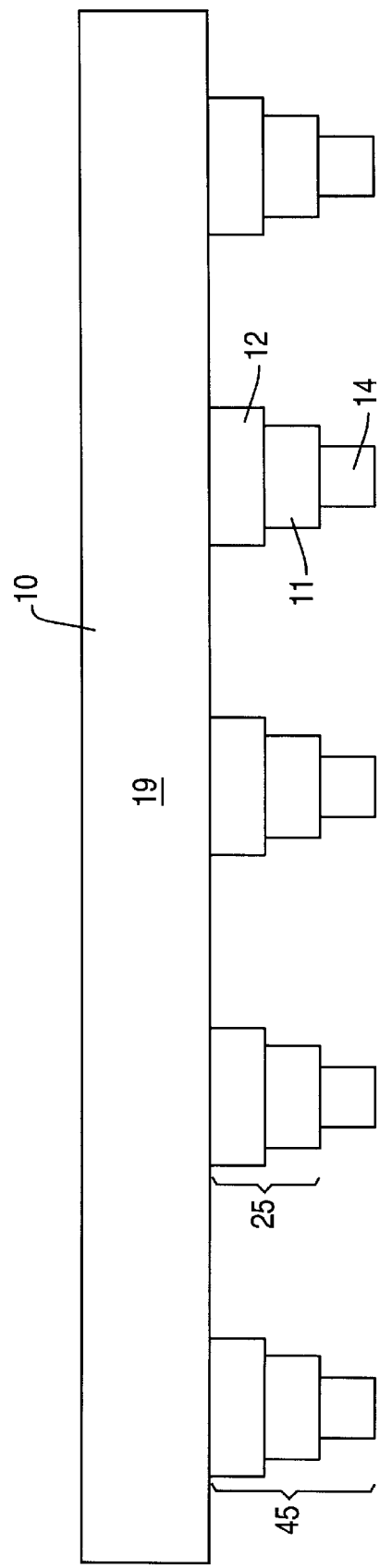
FIG. 8 is a side view of another security paper of this invention wherein a tri-layer is positioned on portions of a base sheet.

Other thermoshrinking polymers which are suitable include other nitrogen substituted acrylamides, i.e., poly(N-alkylacrylamide)s, preferably with $C_3$–$C_{10}$ alkyl groups; poly(vinylmethylether)s; poly(ethyleneoxide)s; hydroxypropylcellulose; poly(vinylalcohol)s; poly(ethyl (hydroxyethyl)cellulose) and poly(2-ethyloxazoline)s. FIG. 8 of the present invention shows an alternative embodiment of the present invention, security paper 19, wherein another polymer layer 14 is coated on top of bi-layer 25 to form a tri-layer 45. This third layer can comprise another thermoshrinking polymer to provide a response at a distinct activation temperature.

The thermoshrinking polymer layer may contain additives which do not significantly interfere with shrinking properties at the activation temperature. Suitable additives include pigments, dyes, fluorescent compounds, water repelling agents, phosphorous compounds and magnetic pigments or particles.

The thermoshrinking polymer layer or bi-layer can be applied to the base sheet by conventional coating or printing methods at thicknesses which are conventional for the particular method. Preferred methods include flexographic printing, thermal transfer printing, electrostatic printing, offset printing or blade coating techniques. Printing methods such as flexographic printing, offset printing, as well as on-demand printing such as thermal transfer printing, provide greater control over the location of the bi-layer on the base sheet providing customized distortion patterns. Where the thermoshrinking polymers contain additives such as pigments or flourescent compounds, the bi-layer can provide an additional security feature and/or also serve as a design or printed indicia on the base sheet.

When applying the thermoshrinking polymer to the base sheet, it is desirable to do so at ambient temperature and humidity so that the layer does not distort under ambient conditions.

The entire disclosure of all applications, patents and publications, cited above and below, are hereby incorporated by reference.

Without further elaboration, it is believed that one skilled in the art can, using the preceding description, easily ascertain the essential characteristics of this invention and utilize the present invention to its fullest extent and can also make various changes and modifications of the invention to adapt it to various usages and conditions without departing from the spirit and scope thereof.

What is claimed is:

1. Paper comprising a base sheet with a bi-layer coated thereon, said bi-layer comprising a polymer layer which contacts the base sheet and a layer of thermoshrinking polymers positioned on said polymer layer, wherein the layer of thermoshrinking polymer has a coefficient of thermal expansion distinct from the polymer layer and wherein the bi-layer has an inter-penetrating network of the thermoshrinking polymers and polymers of said polymer layer positioned between the polymer layer and the layer of the thermoshrinking polymers.

2. Paper as in claim 1, wherein the bi-layer is of a thickness sufficient to distort the paper when heated.

3. Paper as in claim 2, wherein the bi-layer covers from 5% to 100% of the surface of the base sheet.

4. Paper as in claim 2, wherein the thermoshrinking polymer has an activation temperature in the range of 40° C. to 70° C.

5. Paper as in claim 2, wherein the thermoshrinking polymer has two activation temperatures in the range of 40° C. to 70° C.

6. Paper as in claim 2, wherein the response from the bi-layer to an activation temperature is reversible.

7. Paper as in claim 6, wherein the thermoshrinking polymer in the bi-layer is poly(N-isopropylacrylamide) and the polymer layer comprises polyacrylamide.

8. Paper as in claim 1, wherein the bi-layer is of a thickness which is less than 1.0 times the thickness of the base sheet.

9. Paper as in claim 1, wherein the thermoshrinking polymer is selected the group consisting of poly(N-alkylacrylamide)s, poly(vinylmethylether), poly(ethylene oxide), hydroxypropylcellulose, poly(vinylalcohol), poly(ethyl(hydroxyethyl)cellulose), and poly(2-ethyl oxazoline).

10. Paper as in claim 9, wherein the polymer layer comprises polyacrylamide.

11. Paper as in claim 1, wherein the bi-layer contains an additional polymer layer having a coefficient of thermal expansion distinct from the polymer of said polymer layer and the polymer of the layer of thermoshrinking polymers.

12. Paper comprising a base sheet with a bi-layer coated thereon, said bi-layer comprising a polymer which contacts the base sheet and a layer of thermoshrinking polymers positioned on said polymer layer, wherein the layer of thermoshrinking polymers has a coefficient of thermal expansion distinct from the polymer layer and wherein the bi-layer is coated on two or more separate regions of said base sheet and each region comprises of at least 5% of the surface of said base sheet and extends across the length of said sheet.

13. Paper comprising a base sheet with a bi-layer coated thereon, said bi-layer comprising a polymer layer which contacts the base sheet and a layer of thermoshrinking polymers positioned on said polymer layer, wherein the layer of thermoshrinking polymers has a coefficient of thermal expansion distinct from the polymer layer and the bi-layer contains an additional polymer layer having a coefficient of thermal expansion distinct from the polymer layer and the layer of thermoshrinking polymers and wherein the additional polymer layer comprises a thermoshrinking polymer distinct from the polymer of the layer of thermoshrinking polymers.

14. Paper comprising a base sheet with a bi-layer coated thereon, said bi-layer comprising a polymer layer which contacts the base sheet and a layer of thermoshrinking polymers positioned on said polymer layer, wherein the layer of thermoshrinking polymers has a coefficient of thermal expansion distinct from the polymer layer and wherein the base sheet is selected from the group consisting of coated papers selected from the group consisting of those used in ink jet printing, impact printing, flexographic painting, thermal transfer printing, electrostatic printing, relief printing, offset printing, intaglio printing, lithography and silk screening.

* * * * *

UNITED STATES PATENT AND TRADEMARK OFFICE
CERTIFICATE OF CORRECTION

PATENT NO. : 6,132,854
DATED : October 17, 2000
INVENTOR(S) : Frank J. Kenny

It is certified that error appears in the above-indentified patent and that said Letters Patent is hereby corrected as shown below:

Column 5, Line 38, after "selected" insert -- from --.

Signed and Sealed this

Twenty-second Day of May, 2001

Attest:

NICHOLAS P. GODICI

Attesting Officer     Acting Director of the United States Patent and Trademark Office